May 1, 1923.

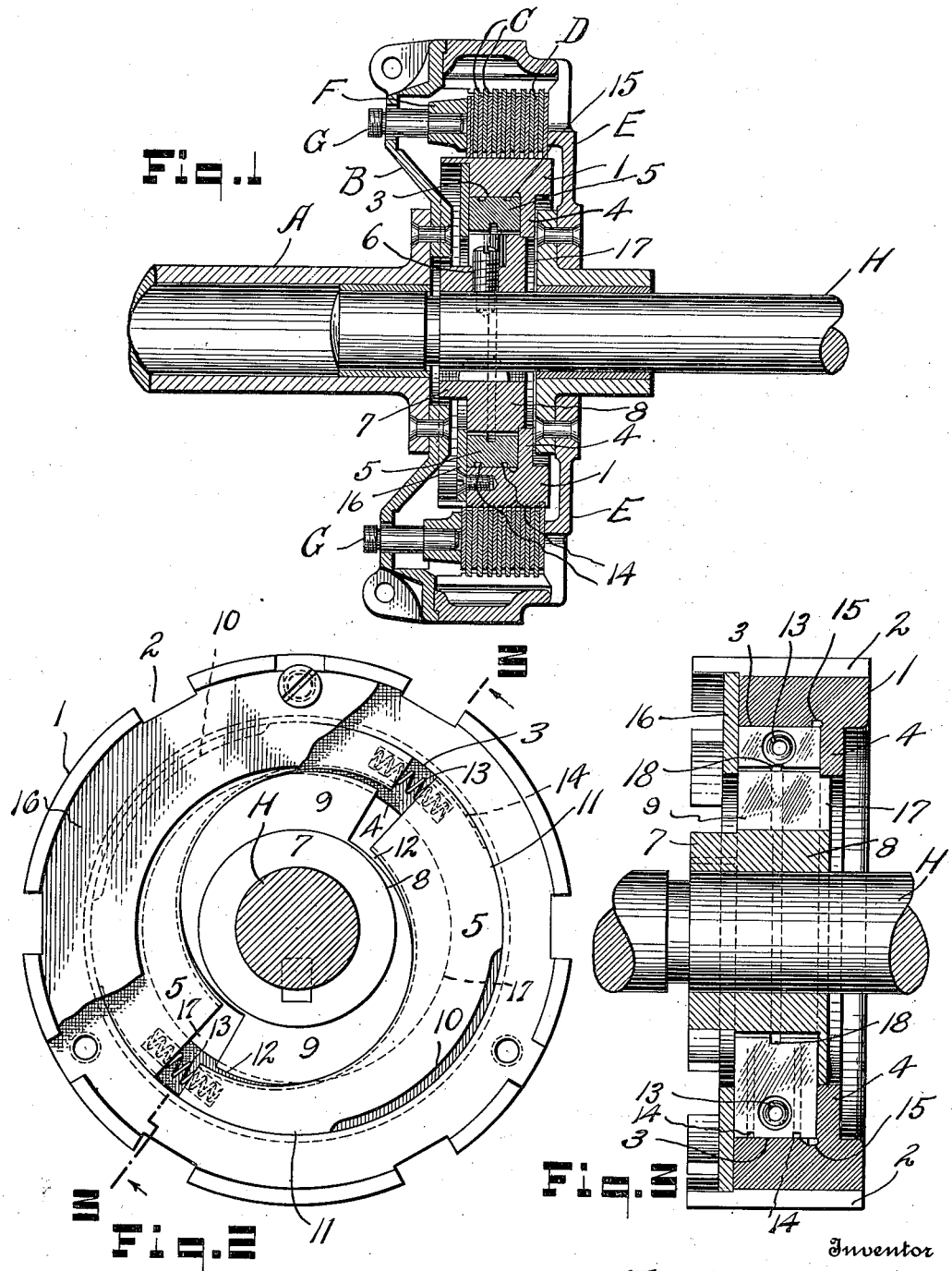

T. H. DUNCOMBE

OVERRUNNING CLUTCH

Filed Dec. 16, 1921

Inventor
Tyrrell H. Duncombe

By

Attorneys

Patented May 1, 1923.

1,453,548

UNITED STATES PATENT OFFICE.

TYRRELL H. DUNCOMBE, OF DETROIT, MICHIGAN.

OVERRUNNING CLUTCH.

Application filed December 16, 1921. Serial No. 522,771.

*To all whom it may concern:*

Be it known that I, TYRRELL H. DUNCOMBE, a citizen of the United States of America, residing at Detroit, in the county of Wayne and State of Michigan, have invented certain new and useful Improvements in Overrunning Clutches, of which the following is a specification, reference being had therein to the accompanying drawings.

This invention relates to a device for connecting a driving and a driven member and permitting the driven member to rotate freely in an advanced direction independently of the driving member, and the object of the invention is to provide a construction wherein a strong frictional connection is set up between the driving and driven members upon the slightest forward rotation of the driving member in advance of the driven member, whereby slippage is prevented and power is applied under all conditions to drive the driven member when the speed of the driven member does not exceed that of the driving member. A further object is to provide a construction wherein the driven member will, under all conditions, be free to rotate faster than the driving member and the frictional connection set up by the tendency of the speed of the driven member to lag behind that of the driving member, will be immediately relieved whenever the driven member tends to rotate faster than the driving member, thereby permitting a perfectly free forward rotation of the driven member independently of the driving member, at all times.

It is also an object of the invention to provide, in a construction employing friction members interposed between the driving and driven members and operated by cam members, means for constantly holding the friction members in yielding contact with the member into engagement with which they are adapted to be forced by the cam members, whereby said friction members are at all times and under all conditions held in position to immediately engage the friction surface with a strong frictional contact which will preclude the possibility of slippage between said members and said surface.

It is also an object of the invention to so construct these friction members as to insure an even contact with the surface engaged thereby and to increase and insure such frictional engagement by a slight yielding action of said members.

It is also an object of the invention to provide a compact arrangement of parts which is such that the device may be made of any desired size and form for application wherever an over-running connection between driving and driven members is desired.

With the above and other ends in view, the invention consists in the matters hereinafter set forth and more particularly pointed out in the appended claims, reference being had to the accompanying drawings in which—

Figure 1 is a longitudinal sectional view illustrative of the application of a device embodying the invention to a particular mechanism including a driving and a driven shaft and connecting and disconnecting means for transmitting motion from the driving to the driven shaft;

Fig. 2 is an enlarged end elevation of the device illustrative of the invention and showing parts broken away to more clearly disclose the construction;

Fig. 3 is a transverse section of the same substantially upon the line 3—3 of Fig. 2;

Figure 4:
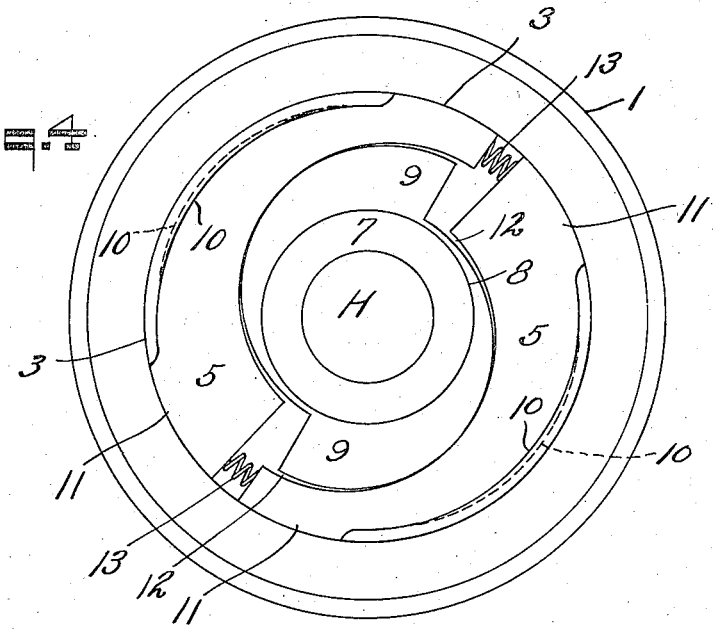
Fig. 4 is an outline drawing showing the device embodying the invention in end elevation and illustrating its operation.
Figure 5:
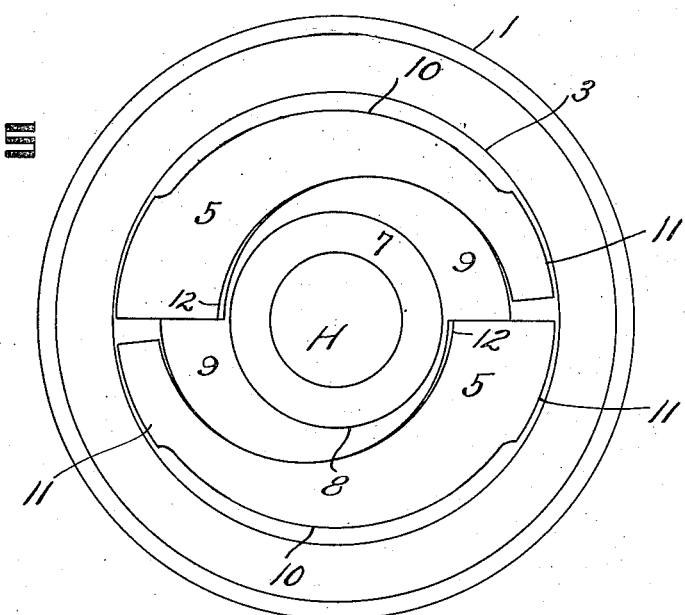
Fig. 5 is a similar view with the springs, which are shown in place in Fig. 4, removed, to more clearly illustrate the operation.

This invention, in its broad scope, relates to what is commonly known as an over-running connection or clutch and this device may be applied wherever it is desired to connect two rotating members so that one member will always be free to rotate in one direction of rotation, in advance of the other. For the purpose of illustration, however, the device embodying the invention has been illustrated in Fig. 1 of the drawings as applied to driving and driven shafts which are connected by a friction clutch of the multiple disk type, said device being interposed between the driven members of the multiple disk clutch and the driven shaft to permit said driven shaft to turn freely in the direction of rotation, in advance of the rotation of the driving shaft. Such construction is particularly adaptable for installation in motor vehicles wherein the driving power or engine is connected to the driven or propeller shaft by means of a friction clutch so that by the operation of said clutch, the engine may be at any time disconnected from the propeller shaft to stop the transmission of motion to the rear wheels of the vehicle. By combining the device embodying the invention, with the multiple disk clutch, as illustrated in Fig. 1 of the drawings, such device permits the driven or propeller shaft to turn in the forward direction of rotation, independently of the driving or engine shaft and therefore the vehicle is always free to advance at a greater speed than that at which it is being driven by the engine. The construction shown in Fig. 1 is however merely illustrative of one use to which the overrunning device embodying the invention may be put and it is obvious that this device may be employed wherever it is desired to connect two members to turn in the same direction and to permit a free rotation of one of the members at a greater speed than the other in said direction.

Referring to Fig. 1, A represents the engine or driving shaft, to the end of which shaft is secured a suitable casing B within which is a drum or ring 1 which, in the particular application of the invention, is a member of the over-running connection embodying the invention. C and D indicate the usual arrangement of alternating friction plates or rings, with the rings C connected at their outer periphery in the usual manner with the casing B to turn therewith and to slide longitudinally therein, and the rings D alternating with the rings C connected at their inner peripheries to the drum 1, said rings being formed with lugs to engage peripheral slots 2 in the drum so that said rings D will turn with the drum and are free to slide longitudinally thereon. A closure plate E forms an abutment for the friction rings C, D at one end of the series and a master ring F which is carried by pins G passing through openings in the casing B is provided to engage the friction rings at the other end of the series and by suitable mechanism (not shown) to be forced toward said friction rings to crowd the same into frictional engagement with each other so that a driving connection will be established between the casing B which is carried by the driving shaft A, and the drum 1 to turn said drum and transmit motion to the driven shaft H through the over-running mechanism which is enclosed within the drum 1.

The over-running mechanism embodying the invention, as shown in detail in Figs. 2 and 3, comprises the ring drum 1 formed with a concentric inner bearing surface 3 and an inwardly extending flange 4 adjacent one side of this bearing surface. Placed loosely within the drum is a pair of friction members or shoes 5 of segmental form and secured upon the driven shaft H in any suitable manner, as by a set screw 6, is a cam member 7, the hub portion 8 of which is formed with laterally extending cams 9, the outer or contact surfaces of which cams are formed eccentric to the axis of the shaft H. The friction shoes 5 are formed to fit loosely within the space between the cams 9 and the inner concentric surface 3 of the drum 1, said shoes being tapered in the direction of their length and being of greater width at one end than at the other to substantially fill the space between the cams 9 and the drum. The outer surface of each shoe 5, which surface is adapted to engage the surface 3 of the drum, is cut away as at 10 intermediate the ends of each shoe so that said shoes will bear upon the drum at their end portions only, as at 11. The inner surface of each shoe which is adapted to be engaged by the eccentric outer surface of its operating cam 9, has a greater radius than the radius of said surface of the cam, so that each cam 9 will bear against the inner surface of its shoe intermediate the end portions thereof, only, and opposite the cut-away outer side 10 of the shoe.

Interposed between the adjacent ends of the friction shoes 5 are coiled springs 13, said springs being set into holes bored in the ends of the shoes. These springs exert a force to hold the shoes in spaced relation with their ends separated a short distance, and to hold the shoes pressed outwardly with a yielding contact against the inner surface 3 of the drum 1, so that, as illustrated in Fig. 4, each shoe will be held against the surface 3 and in position to immediately grip said surface or engage the same with sufficient frictional contact to transmit motion from the driving member or drum 1 to the driven member or shaft H, immediately upon any turning movement of the drum and cam, relatively. Further, these springs hold the two shoes in accurate spaced relation and prevent them from sliding endwise, one toward the other, when the pressure of the cams thereon is relieved, and therefore, either shoe will not so move and wedge itself into the narrow end of the space between the cam and drum and both shoes will always be held in proper position to be engaged at the proper point by the cams so that the force of the cams will be applied thereto at the proper point to give the desired frictional and driving engagement, immediately upon any tendency of the cam to turn in a direction reversely of the direction of rotation of the drum. In other words, the springs function to maintain the shoes in proper relation to the cams and in yielding contact with the surface 3 of the drum so that the shoes will be forced immediately into frictional contact with the drum and all possibility of slippage eliminated.

Further, by cutting away the outer surface of the shoes intermediate their ends and arranging the cams to engage the inner surfaces thereof intermediate their ends, the shoes will spring slightly as illustrated in dotted lines in Fig. 4 when the force of the cams is applied, and the end portions 11 of the shoes will therefore be yieldingly forced into contact with the drum surface with sufficient frictional engagement to preclude slippage under all conditions and give a rigid driving connection whenever the tendency of the driving member is to turn faster than the driven member.

It will be understood that the springs 13 exert just sufficient force to hold the shoes in contact with the face 3 of the drum without creating sufficient friction therebetween to transmit motion from the drum to the driven shaft through the shoes. By holding the shoes in contact with the surface of the drum, oil is prevented from getting between the contact surfaces to such an extent as to cause slippage and thus the shoes are always in slight frictional contact with the drum so that upon the least tendency of the drum to drive the driven member, the shoes will, without the least slippage, frictionally engage the drum to transmit motion. By making and arranging the shoes so that they will not drop away from the drum surface only just sufficiently to relieve the frictional contact, the oil is not only excluded from between the contact surfaces, but the shoes are in a position so that upon slightest tendency of the driven member to lag behind the driving member, these shoes will be brought into frictional driving engagement and there will be no slippage which might otherwise take place due to the time required to move these shoes into engagement with the driving member. This dropping away of the shoes from the surface which they are adapted to engage may be prevented by other means then the springs shown, but yielding means is preferably employed for the reason that, should the contingency arise of small particles of foreign matter getting between the contact surfaces, these yielding spacers for the shoes will give sufficiently to allow such matter to work out from between the surfaces instead of being ground into the surfaces. Further, by spacing the ends of the shoes apart, a space is provided into which the oil scraped from the surface of the drum by the ends of the shoes may flow, and as the oil has free access to the contact surface 3 of the drum between said ends, this surface will be lubricated just sufficiently to prevent the shoes from adhering thereto and cutting and wearing away the surfaces, but the oil will be scraped from the surface 3 as the shoes revolve about the axis of the driven member, to such an extent as not to interfere with the strong frictional engagement between the shoes and drum.

If found desirable, a groove or grooves 14 extending longitudinally of the shoes may be formed in the outer contact surfaces thereof to further assist in the elimination or escape of foreign matter or oil from between these surfaces of the shoes and the surface of the drum, and for the same purpose a groove 15 may be provided at the meeting angle between the surface 3 and the inner face of an inwardly extending flange 4 on the drum, which flange forms an abutment to engage one side of the shoes and hold them in place within the drum, a suitable ring 16 being secured in any suitable manner to the drum at the other side of the shoes to prevent said shoes from moving longitudinally of the drum. An end portion 17 of the cam member 7 is also provided to fit within the internal diameter of the flange 4, said portion being formed concentric with the axis of rotation of the shaft H to which the member is secured so that the drum and cam member will be held in accurate concentric relation and the cams of the cam member will therefore always engage the shoes with an even pressure.

It will also be found desirable to form an oil groove 18 in the inner surface of the shoe, which surface is engaged by the outer face of the cams, such groove facilitating the escape of oil and foreign matter from between the contacting faces of the cams and shoes.

Obviously, unless the springs 13 or some other means be employed to hold the shoes in spaced relation to each other, said shoes would, during rotation and while free from the pressure of the cams, move endwise relatively and would, because of the direction of rotation, move in the direction of their small ends which would be wedged thereby between the drum and cam, and further, without such spacing means, the shoes would be free to move, causing a rattling noise as they are carried around by the rotation of the cam member.

Obviously, changes in the size and proportion of the parts and in the shape and particular arrangement thereof may be made within the scope of the appended claims, without departing from the spirit of the invention and I do not therefor limit myself to the particular construction shown.

Having thus fully described my invention, what I claim is:—

1. In a device of the character described, the combination with a driving member and a driven member, of a member secured to one of said first named members to turn therewith and having an annular contact surface, a cam member secured to the other of said first named members to turn therewith, a pair of friction shoes interposed between said annular face and said cam member and means interposed between the adjacent ends of said shoes for yieldingly holding said shoes in spaced relation to each other and in yielding contact with said annular face.

2. In a device of the character described, the combination with a driving member and a driven member, of a drum secured to one of said first named members and having an internal annular contact face, a cam member secured to the other of said first named members and provided with cams, a pair of friction shoes interposed between said annular face and said cams to be forced into frictional driving engagement with said annular face by a relative turning movement of said drum and cam member in one direction of rotation, and springs interposed between the adjacent ends of the shoes to yieldingly hold said shoes in spaced relation to each other and in rubbing contact with said annular face.

3. In a device of the character described, the combination with a driving member and a driven member, of a drum secured to one of said members and having an internal annular contact face, a cam member secured to the other of said members and having laterally extending cams, and friction shoes interposed between said annular face and said cams, said shoes being each formed to contact said annular face at end portions only of each shoe, and the inner contact face of said shoes and the outer contact face of said cams being semi-circular with the radii of the face of each shoe of different length than the length of the radii of the face of the contacting cam to provide a substantially line contact between the shoes and cams with the cams contacting the shoes intermediate the ends of said shoes, whereby upon relative turning movement of said drum and cam member, said shoes will be forced by said cams into contact with the drum at their end portions only and caused to yield.

4. In a device of the character described, the combination with a driving member and a driven member, of a drum connected to one of said members to turn therewith and provided with an internal annular contact face, a cam member connected to the other of said members to turn therewith and provided with opposed cams, segmental shoes interposed between said annular face and said cams, the outer contact surface of each shoe being cut away intermediate the ends thereof and said shoes and cams being formed to contact intermediate the ends of the shoes, and yielding means for yieldingly holding said shoes with their adjacent ends in spaced relation and the shoes in constant rubbing contact with said annular face of the drum.

In testimony whereof I affix my signature in presence of two witnesses.

TYRRELL H. DUNCOMBE.

Witnesses:
 LEWIS E. FLANDERS,
 ANNA M. DORR.